United States Patent [19]

Metcalfe

[11] Patent Number: 5,180,172
[45] Date of Patent: Jan. 19, 1993

[54] ECCENTRIC FACE SEAL WITH ASYMMETRIC CLOSING FORCE

[75] Inventor: Raymond Metcalfe, Ontario, Canada

[73] Assignee: Atomic Energy of Canada Limited, Ottawa, Canada

[21] Appl. No.: 745,409

[22] Filed: Aug. 15, 1991

[30] Foreign Application Priority Data

Aug. 16, 1990 [CA] Canada .................. 2023456

[51] Int. Cl.⁵ ............................................. F16J 15/34
[52] U.S. Cl. ...................................... 277/27; 277/96.1
[58] Field of Search ................ 277/27, 30, 97, 81 R, 277/83, 93 R, 93 SD, 91, 73, 28, 96.1, 98

[56] References Cited

U.S. PATENT DOCUMENTS

| | | | |
|---|---|---|---|
| 2,650,842 | 9/1953 | Coopman | 277/91 |
| 2,754,140 | 7/1956 | Stevens | 277/91 |
| 2,761,711 | 9/1956 | Ecker | 277/91 |
| 2,768,011 | 10/1956 | Mosher | 277/91 |
| 2,834,619 | 5/1958 | McNab | 277/28 |
| 3,050,310 | 8/1962 | Kuiken | 277/30 |
| 3,499,653 | 3/1970 | Gardner | 277/27 |
| 4,012,049 | 3/1977 | Lambrecht | 277/73 X |
| 4,026,564 | 5/1977 | Metcalfe | 277/96.1 |
| 4,290,613 | 10/1981 | Scott . | |
| 4,296,935 | 11/1981 | Inouye . | |
| 4,323,255 | 3/1982 | Wiese . | |
| 4,407,509 | 10/1983 | Etsion | 277/96.1 X |
| 4,407,512 | 11/1983 | Trytek . | |
| 4,605,234 | 8/1986 | Metcalf . | |
| 4,722,534 | 2/1988 | Wentworth | 277/93 SD |
| 4,832,351 | 5/1989 | Ciotola | 277/27 X |

FOREIGN PATENT DOCUMENTS

| | | | |
|---|---|---|---|
| 1035426 | 7/1958 | Fed. Rep. of Germany | 277/73 |
| 47-28379 | 7/1972 | Japan | 277/27 |

Primary Examiner—William A. Cuchlinski, Jr.
Assistant Examiner—Scott W. Cummings
Attorney, Agent, or Firm—Gowling, Strathy & Henderson

[57] ABSTRACT

An eccentric face seal for rotary machines in which the closing force of the seal faces towards one another is asymmetric. The asymmetric closing force is utilized to produce corresponding variations in the face seal gap which tends to produce fluid flow across the seal face in a direction opposite to the leakage produced by the pressure difference, and thereby eliminate or reduce leakage. Closing forces can be applied by at least a pair of springs providing different compressive forces or by hydraulic actuation in which the total combined forces can readily be made to vary with fluid operating pressure. In one embodiment the hydraulic actuation is provided by asymmetric pressure responsive areas of the rotor or stator.

5 Claims, 3 Drawing Sheets

ECCENTRIC FACE SEAL WITH ASYMMETRIC CLOSING FORCE

FIELD OF THE INVENTION

This invention relates to an eccentric face seal for rotary machines.

BACKGROUND OF THE INVENTION

Applicant's U.S. Pat. No. 4,026,564 issued May 31, 1977 discloses a face seal in which an eccentric annular seal face of the stator is resiliently urged against the seal face of the rotor. Such eccentric design provides improved lubrication and cooling of the contacting seal faces. Although seal performance is improved by such an arrangement, it is difficult to eliminate leakage entirely due to seal face convergence or separation resulting from heat distortion, wear, etc.

U.S. Pat. No. 4,407,509 issued Oct. 4, 1983 to I. Etsion, discloses a face seal purporting to provide zero-leakage. The disclosed device uses gap widths of different size associated with annular arcs forming a closed curve. The patent also discloses an embodiment with an eccentric circular face, but it does not disclose how proper alignment of the seal faces to maintain the desired gaps is to be maintained. Also, the disclosed device, because of the gaps, allows leakage at standstill or low speed, for which it is suggested an additional barrier may be provided.

SUMMARY OF THE INVENTION

An object of the present invention is to minimize, eliminate or reverse leakage in a face seal.

Another object of a specific embodiment of the present invention is to facilitate control of leakage under varying operating conditions.

It has been found that the sealing performance of an eccentric face seal can be improved by providing an asymmetric closing force on the eccentric seal faces. The asymmetric closing force is utilized to produce corresponding variations in the face seal gap which tends to produce fluid flow across the seal face in a direction opposite to the leakage produced by the pressure difference, and thereby reverse, eliminate or reduce leakage.

In accordance with the present invention there is provided a face seal for a rotary machine having a rotor sealingly mounted to a rotatable shaft of the machine and a stator sealingly connected to a housing of the machine, and having opposing substantially planar seal faces, one of which has an annular shape and which is eccentric with respect to the longitudinal axis of the shaft, said seal faces forming a partition between a region of relatively high pressure and a region of relatively low pressure; the improvement comprising: one of the rotor or stator including a movable element mounted for motion along the longitudinal axis of the shaft, and tiltable about the longitudinal axis, and sealingly secured to the shaft or housing, respectively; means for applying an asymmetric closing force on the movable element towards the seal faces such that a higher closing force is applied to a portion of the seal face where the relative velocity vector is directed from a region of higher to lower fluid pressure than to an opposite portion where the relative velocity vector is directed from a region of lower to higher fluid pressure.

Figure 1:
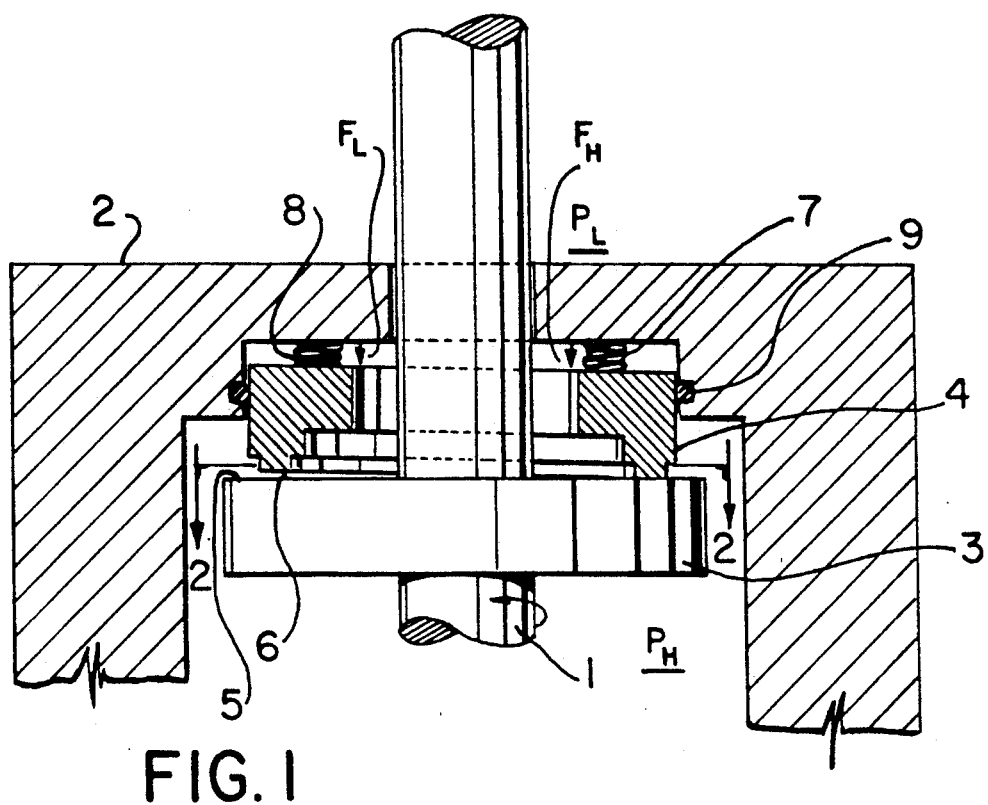
FIG. 1 is a sectional view of an embodiment of a seal in accordance with the present invention.
Figure 3:
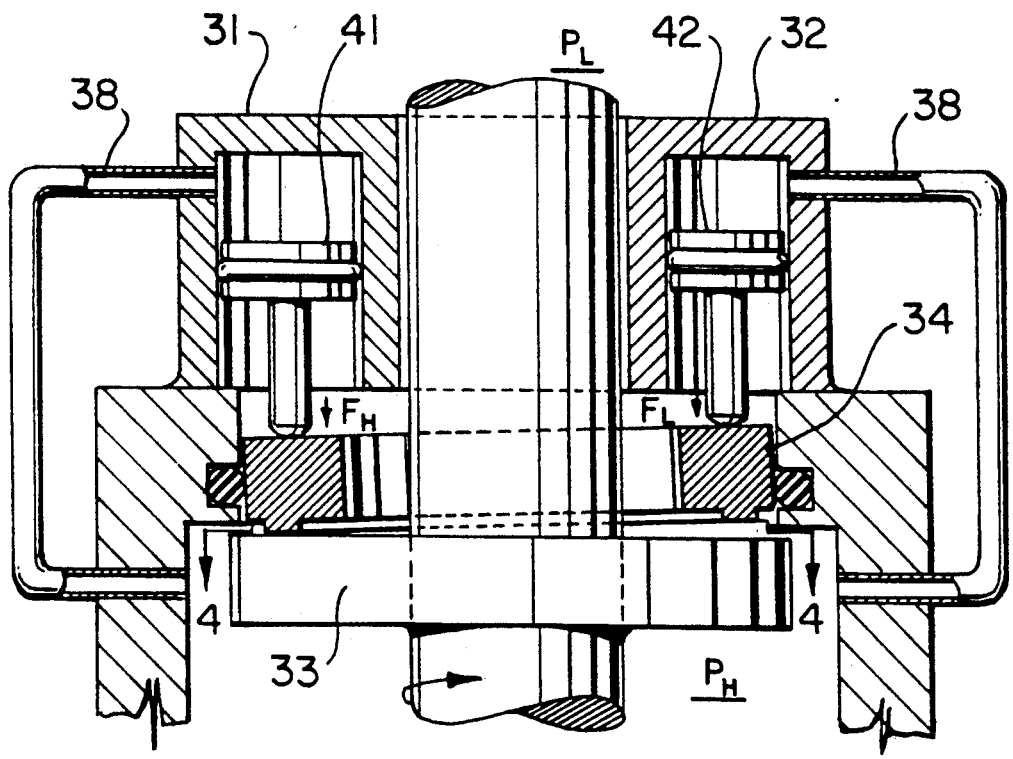
FIG. 3 is a sectional view of an another embodiment of the present invention including hydraulic actuating means for applying asymmetric closing force to the seal faces against one another.
Figure 4:
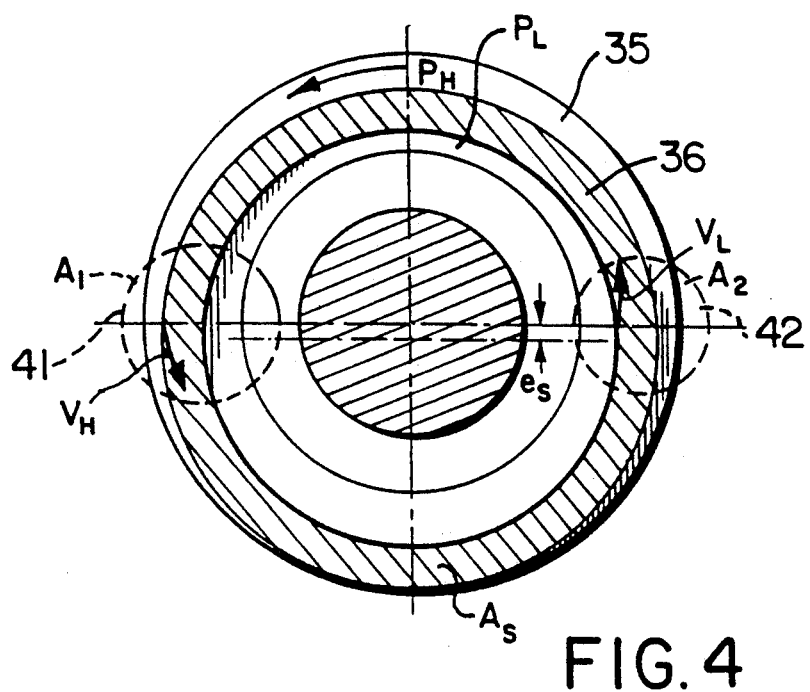
FIG. 4 is sectional view taken at 4—4 of FIG. 3 showing adjacent seal faces.
Figure 5:
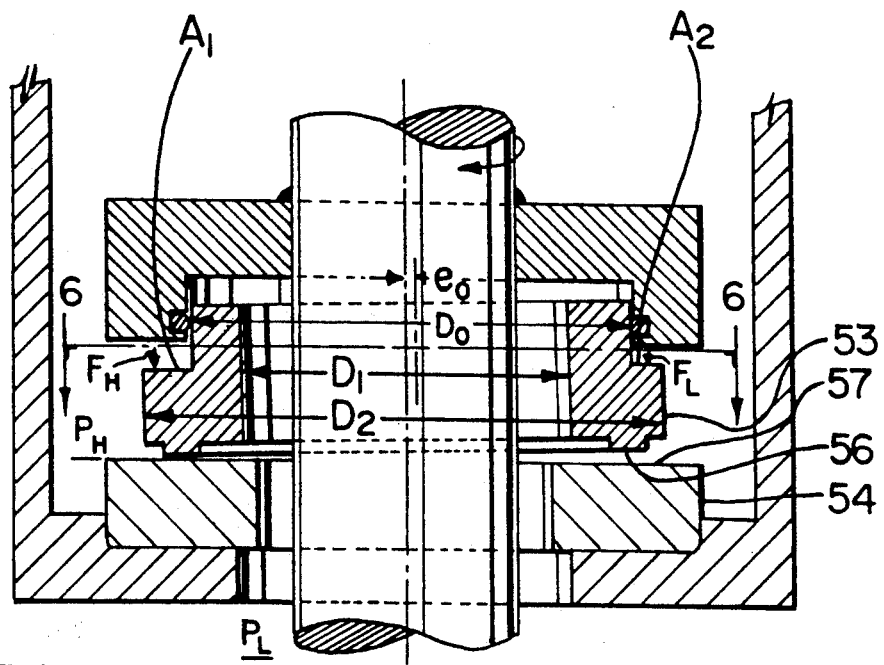
FIG. 5 is a sectional view of yet another embodiment of the present invention in which an asymmetric closing force is provided by an asymmetric pressure responsive areas of a rotor element.

Note that the gap size shown between seal faces in FIGS. 1, 3, and 5, is shown larger than the actual gap size in operation.

DESCRIPTION OF THE PREFERRED EMBODIMENTS

Figure 2:
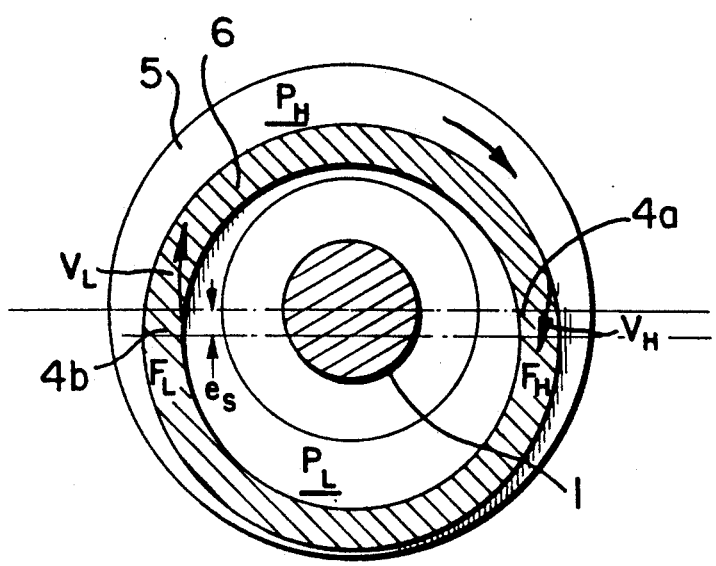
FIG. 2 is sectional view taken at 2—2 of FIG. 1 showing adjacent seal faces.

With reference to FIGS. 1 and 2, a portion of a rotary machine is shown to include a rotatable shaft 1 and housing 2. The seal elements include a rotor 3 sealingly connected to the shaft 1 and a stator 4 sealingly connected to the housing 2. Each of rotor 3 and stator 4 have adjacent seal faces, 5 and 6, respectively, separated by a narrow gap.

The adjacent seal faces 5 and 6 define a partition between a region of relatively high pressure $P_H$ and a region of relatively low pressure $P_L$.

The seal face 6 of the stator 4 is annular and eccentric with respect to the longitudinal axis of the shaft 1, as can be best seen in FIG. 2. This eccentricity of seal face 6 is shown as $e_s$ and is defined by the displacement of the centre of seal face 6 from the longitudinal axis of shaft 1 or, rather, the centre of rotation of rotor 3. The seal faces 5 and 6 are urged towards one another by means of springs 7 and 8.

The stator 4 is movably mounted for motion along the longitudinal axis of the shaft, and tiltable about the longitudinal axis, and sealingly secured to the housing 2 by means of O-ring seal 9.

In accordance with the present invention, springs 7 and 8 are arranged to apply an asymmetric closing force whereby seal faces 5 and 6 are urged towards one another. The closing force of the present invention is asymmetric with respect to an axis connecting the centre of the eccentric seal face, 6, and the centre of rotation of the rotor, 3. Thus, the closing force applied on one side of such axis is greater than the force applied on the opposite side.

In the case where a higher pressure, $P_H$, exists outside of the seal faces (inside housing 2), spring 7 applies a higher closing force $F_H$ at seal portion 4a relative to closing force $F_L$ applied by spring 8 at seal portion 4b.

Due to the eccentric positioning ($e_s$) of the seal face, the tangential velocity vector, $V_H$, of rotor 3 at portion 4a is generally directed towards the interior of the seal face 6. In this manner, fluid contained within the gap formed by the seal faces is also directed towards the interior of seal face 6. Thus, in the case of a higher pressure existing outside of the seal face, the fluid is directed from a region of higher fluid pressure $P_H$ to a region of lower fluid pressure $P_L$. Similarly, the tangential velocity vector $V_L$ at 4b is directed outside of seal face 6. Thus, fluid contained within the seal face gap at this portion is directed, or pumped, outside of the seal face, from a region of lower fluid pressure $P_L$ to that of higher fluid pressure $P_H$.

In operation, with a higher pressure $P_H$ within the housing 2 relative to the outside $P_L$, the spring compressive forces are selected, as indicated above, to be higher $F_H$ at the seal portion 4a than at 4b. A lower force $F_L$ with spring 8 at portion 4b relative to 4a results in a relatively larger gap at that portion. More fluid will be carried or pumped across the annulus at the larger gap, as compared with the smaller gap, tending to provide a net outflow. At the same time the pressure differential will tend to cause a radially inward flow of fluid across the annulus from the interior of the housing. Since the net outflow will vary with the relative closing forces, $F_H$ and $F_L$, that are applied, the appropriate adjustment of these forces allows the fluid flow to be balanced for zero, reduced, or negative leakage.

The total combined force ($F_H + F_L$) applied by both springs 7 and 8 will be a function of seal face area $A_S$, the pressure responsive area of the stator 4 (defined by O-ring 9 sealing diameter), operating conditions, and the desired or acceptable contact and leakage characteristics.

In the embodiment of FIG. 1 the springs 7 and 8 provide a fixed asymmetric closing force which is suitable for applications where the pressure is constant and of known value. For applications where pressure varies or is not known, it is desirable to have the total combined closing force vary with the pressure difference across the seal face.

With reference to FIG. 3, the seal face 36 of stator 34 is urged toward face 35 of rotor 33 by hydraulic actuators 31 and 32 having pistons 41 and 42, respectively. The actuators are connected with the interior of the housing 37 by means of conduits 38 so that the pistons 41 and 42 are subjected to system operating pressure. The areas $A_1$ and $A_2$ of the pistons 41 and 42 are selected to provide the desired asymmetric closing force of the stator against the rotor, with the area $A_1$ of one piston 41 being larger than the area $A_2$ of piston 42 to apply a corresponding higher closing force $F_H$ to a portion of the seal face where the relative velocity vector is directed from a region of higher to lower fluid pressure than to the opposite portion where a lower force $F_L$ is applied.

The total combined area ($A_1 + A_2$) of piston 41 and 42 will be related to seal face area $A_S$ and the desired closing force of the seal faces towards one another. Suitable total piston area ($A_1 + A_2$) may be in the range of from 50% to 100% of the seal face area $A_S$, depending on the desired or acceptable face contact and leakage characteristics. Suitable area differences for pistons 41 and 42 are in the range 10% to 20%.

An example of suitable hydraulic actuators might include pistons having a piston area difference of 10%, and a total piston area ($A_1 + A_2$) equal to 75% of the seal face area $A_S$.

For the embodiment of FIGS. 1 and 2 utilizing springs, the springs can be selected to provide closing forces equivalent to the forces provided by the pistons referred to above.

Figure 6:
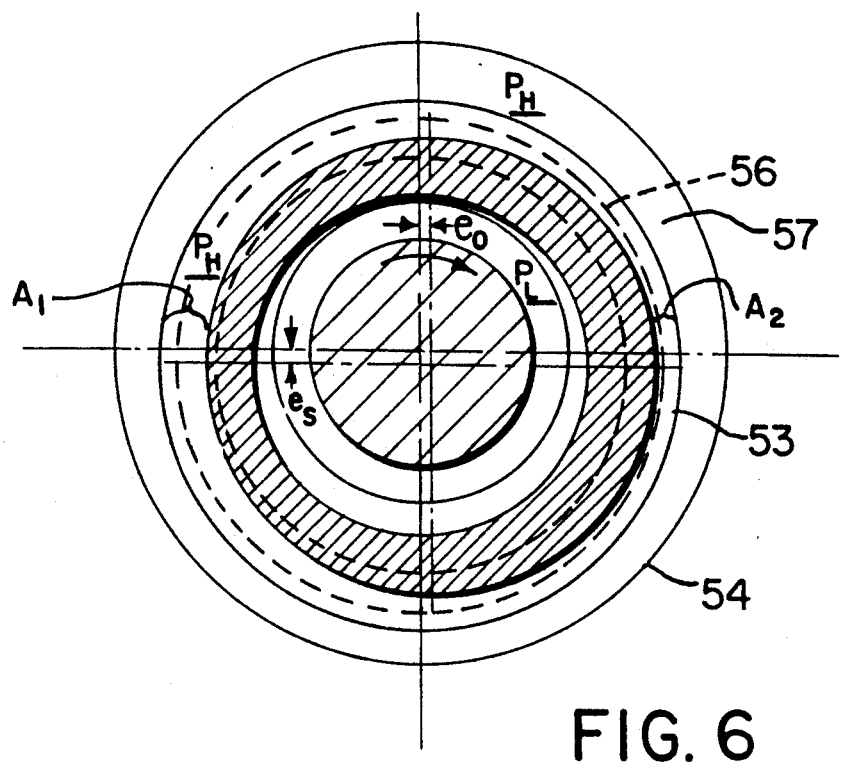
FIG. 6 is sectional view taken at 6—6 of FIG. 5.

FIGS. 5 and 6 illustrate another embodiment which utilises operating system pressure to provide the closing force, and wherein the desired asymmetric closing force is provided by asymmetric geometry of the rotor or stator elements. As can be best seen in FIG. 6, the asymmetric geometry of rotor element 53 is provided by eccentricity $e_o$. As can be best seen in FIG. 5, the hydraulic actuator means are provided by an asymmetric pressure responsive area of the slidable rotor element 53. The sealing diameter $D_o$ of rotor element 53 is eccentric with respect to the inside and outside diameters ($D_1$ and $D_2$ respectively) thereof. This, therefore, results in a larger pressure responsive area $A_1$, disposed within one semi-circle, and diametrically opposite smaller area $A_2$, disposed in the diametrically opposite semi-circle, which are subjected to operating pressure $P_H$. The larger area $A_1$ will exert a higher force relative to the smaller area $A_2$, providing the desired asymmetric closing forces $F_H$ and $F_L$, respectively. As in the previously described embodiment, the selection of relative closing force ($F_H$ and $F_L$) will determine whether leakage is reduced, zero, or reversed. With specific reference to FIG. 5, the total combined closing force is equal to the pressure difference ($P_H - P_L$) multiplied by the area ($A_1 + A_2$) outside the sealing diameter $D_o$ of the rotor element 53.

The embodiment of FIGS. 5 and 6 also shows the reversal of stator and rotor elements. It can be seen that such reversal can be applied to any embodiment, such as the embodiments of FIGS. 1 to 4 disclosed herein.

It will be understood that in applications where the high and low fluid pressures with respect to the seal faces are reversed, or where the direction of rotation is reversed, the positions of the applied asymmetric higher and lower forces must also be reversed.

It will also be understood that the specific means for providing the desired asymmetric closing forces may include means other than those detailed in the embodiments described above.

What is claimed is:

1. In a face seal for a rotary machine having a rotor sealingly mounted to a rotatable shaft of the machine and a stator sealingly connected to a housing of the machine, and having opposing substantially planar seal faces, one of which has an annular shape and which is eccentric with respect to the longitudinal axis of the shaft, said seal faces forming a partition between a region of relatively high pressure and a region of relatively low pressure; the improvement comprising;

one of the rotor and stator including a movable element mounted for motion along the longitudinal axis of the shaft, and tiltable about the longitudinal axis, and sealingly secured to the shaft or housing, respectively;

means for applying an asymmetric closing force on the movable element towards the seal faces such that a higher closing force is applied to a first portion of the seal face where a first tangential velocity vector of the rotor is directed from a region of higher to lower fluid pressure, than to an opposite, second portion of the seal face where a second tangential velocity vector of the rotor is directed from a region of lower to higher fluid pressure.

2. The apparatus of claim 1, wherein said closing force is provided by hydraulic actuator means at said first and second portions of the seal face, each of said actuator means having a pressure responsive portion operatively connected with one of the seal faces, each pressure responsive portion having a pressure responsive area selected to provide a closing force equal to a predetermined percentage of the pressure difference across the seal face multiplied by the seal face area.

3. The apparatus of claim 2, wherein the hydraulic actuators communicate operatively with the interior of the housing for supplying fluid pressure at operating conditions to the pressure responsive portions.

4. The apparatus of claim 3, wherein the hydraulic actuator means is defined by an asymmetric pressure responsive area on the movable element to provide the desired asymmetric closing force.

5. The apparatus of claim 1, wherein the means for applying said asymmetric closing forces are springs.

* * * * *